April 27, 1971  A. G. THORP II  3,576,717
NUCLEAR REACTOR STRUCTURE
Filed Jan. 24, 1968

April 27, 1971 A. G. THORP II 3,576,717
NUCLEAR REACTOR STRUCTURE
Filed Jan. 24, 1968 6 Sheets-Sheet 4

United States Patent Office 3,576,717
Patented Apr. 27, 1971

3,576,717
NUCLEAR REACTOR STRUCTURE
Arthur G. Thorp II, deceased, late of Churchill Borough, Pa., by Ruth S. Thorp, administratrix, Churchill Borough, Pa., assignor to Westinghouse Electric Corporation, Pittsburgh, Pa.
Filed Jan. 24, 1968, Ser. No. 702,500
Int. Cl. G21c 7/08
U.S. Cl. 176—35                                                12 Claims

ABSTRACT OF THE DISCLOSURE

The fuel assemblies in a reactor are fixed arrays of fuel rods without the usual omissions for control rod slots. Instead, a number of fuel rods are omitted in the pattern on a nearly uniform grid throughout the core to provide spaces for pressure thimbles to house control elements of neutron absorbing material, such as a chain or bead type. The control elements are driven in or out of the core by such means as wire rope cables which are grouped to be driven by one mechanism per assembly. The thimbles are sealed at their lower ends and the interior thereof is isolated from the internal pressure of the reactor vessel so that the control elements operate in air or other gas, for example helium.

BACKGROUND OF THE INVENTION

This invention relates, generally, to nuclear reactors and, more particularly, to control elements for nuclear reactors.

In prior reactors of the pressurized water type, control rods having a cruciform cross section are immersed in the primary coolant which is maintained at a relatively high pressure and temperature. The control rod drive mechanism is hermetically sealed to withstand the high internal pressure in the reactor vessel. The drive mechanism must also operate at a high temperature. In some cases, non-uniformity of poison distribution requires the use of control rod followers to prevent flux peaking in the reactor core. The space required for the followers below the core increases the overall height of the reactor vessel, thereby increasing its cost.

An object of this invention is to simplify the construction of a nuclear reactor and reduce the size of the reactor vessel.

Another object of the invention is to obviate the need for control rod followers in a nuclear reactor.

A further object of the invention is to separate reactor control elements and their drive mechanism from the primary coolant and the pressure in a reactor vessel.

Other objects of the invention will be explained fully hereinafter or will be apparent to those skilled in the art.

SUMMARY OF THE INVENTION

In accordance with one embodiment of the invention, control elements, for example of a bead or chain type, are housed in generally cylindrical metal thimbles which are sealed at their lower ends with their upper ends extending outside the reactor vessel. The thimbles are interspersed among the fuel rods in each fuel assembly on a nearly uniform grid pattern throughout the core to provide uniformity of poison distribution. The control elements are driven in or out of the core by means of wire rope cables disposed inside the thimbles and grouped to be driven by one drive mechanism per assembly. Thus the control elements are separated from the primary coolant, and the drive mechanism is not subjected to the high pressure in the reactor vessel.

BRIEF DESCRIPTION OF THE DRAWINGS

For a better understanding of the nature and objects of the invention, reference may be made to the following detailed description, taken in conjunction with the accompanying drawings, in which.

DESCRIPTION OF PREFERRED EMBODIMENT

Figure 1:
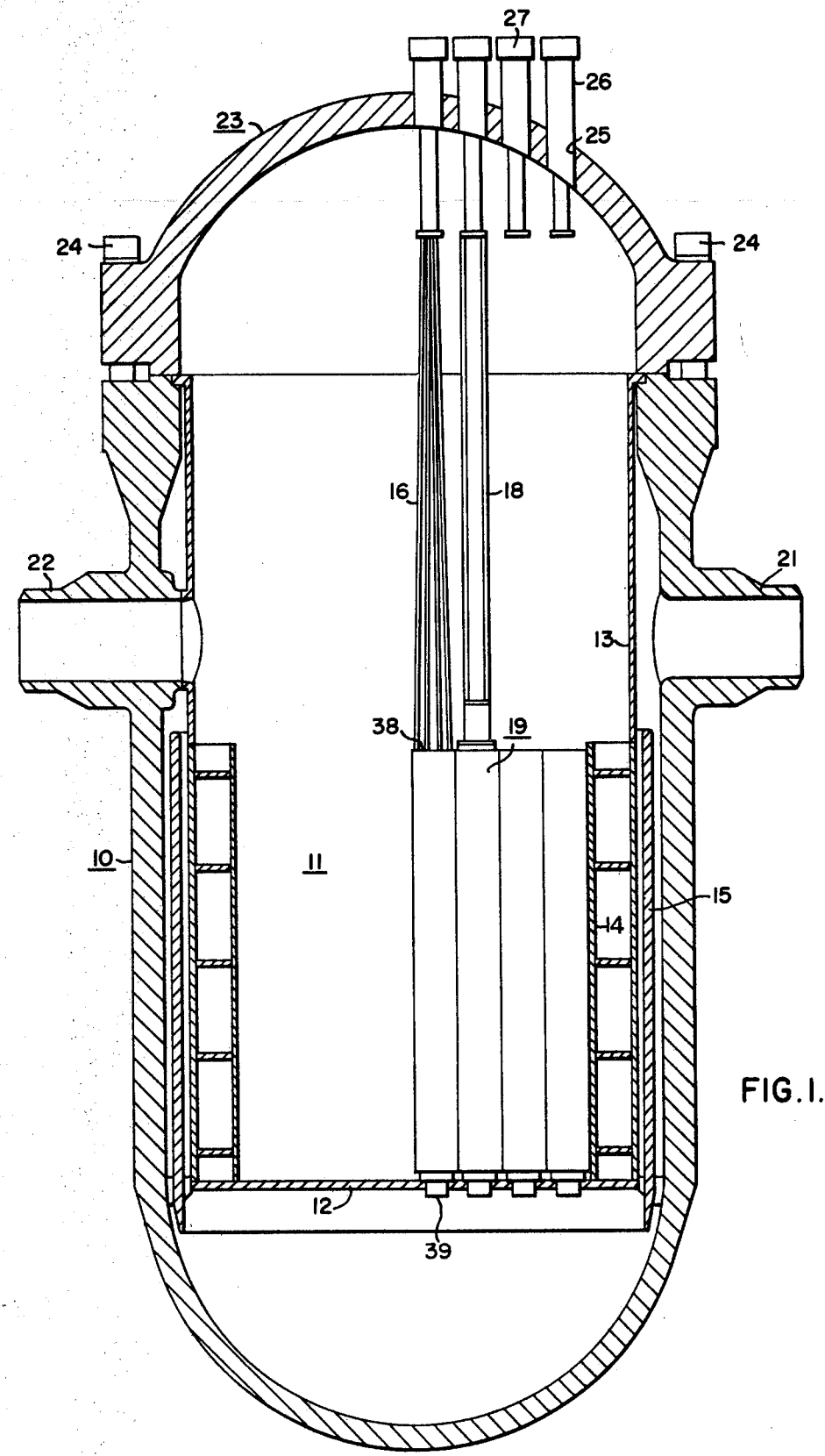
FIG. 1 is a view, in vertical section, of a reactor embodying principal features of the invention.

Referring to the drawings, particularly to FIG. 1, the nuclear reactor shown therein comprises a vessel 10, a reactor core 11, a core plate 12, a core barrel 13 which supports the core plate 12, a baffle 14 disposed between the core barrel 13 and the core 11, a thermal shield 15 disposed between the core barrel 13 and the vessel 10, a plurality of generally cylindrical thimbles 16 which house control elements 17 (FIG. 4), and a support structure 18 for supporting fuel assemblies 19 of the core 11. The reactor is of the liquid cooled, for example pressurized water, type in which the core 11 is immersed in a liquid coolant. Accordingly, the vessel 10 has an inlet nozzle 21 and an outlet nozzle 22 to permit the coolant to be circulated through the vessel at a relatively high internal pressure. The vessel 10 has a removable head 23 which is retained in position by a plurality of head bolts 24. The head 23 has a plurality of ports 25 therethrough, there being at least one port for each fuel assembly 19.

Figure 2:
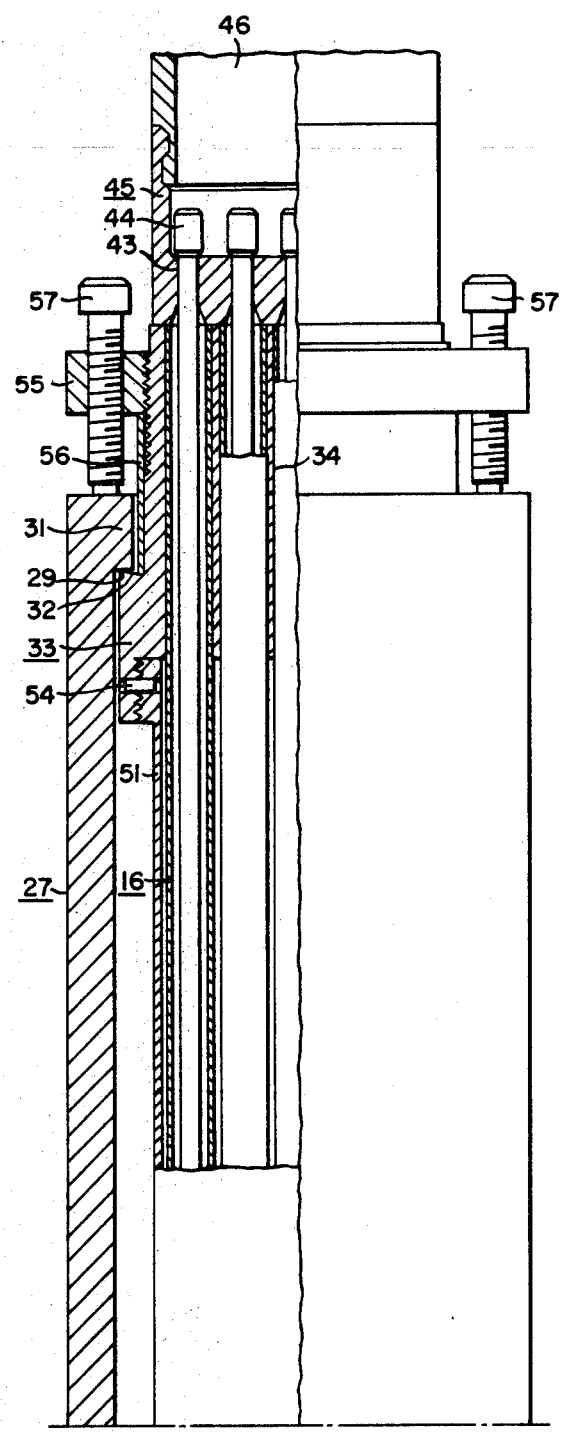
FIGS. 2, 3 and 4, when laid end-to-end, constitute an enlarged view, partly in section and partly in elevation, of an assembly of control elements for a fuel assembly of the reactor.
Figure 3:
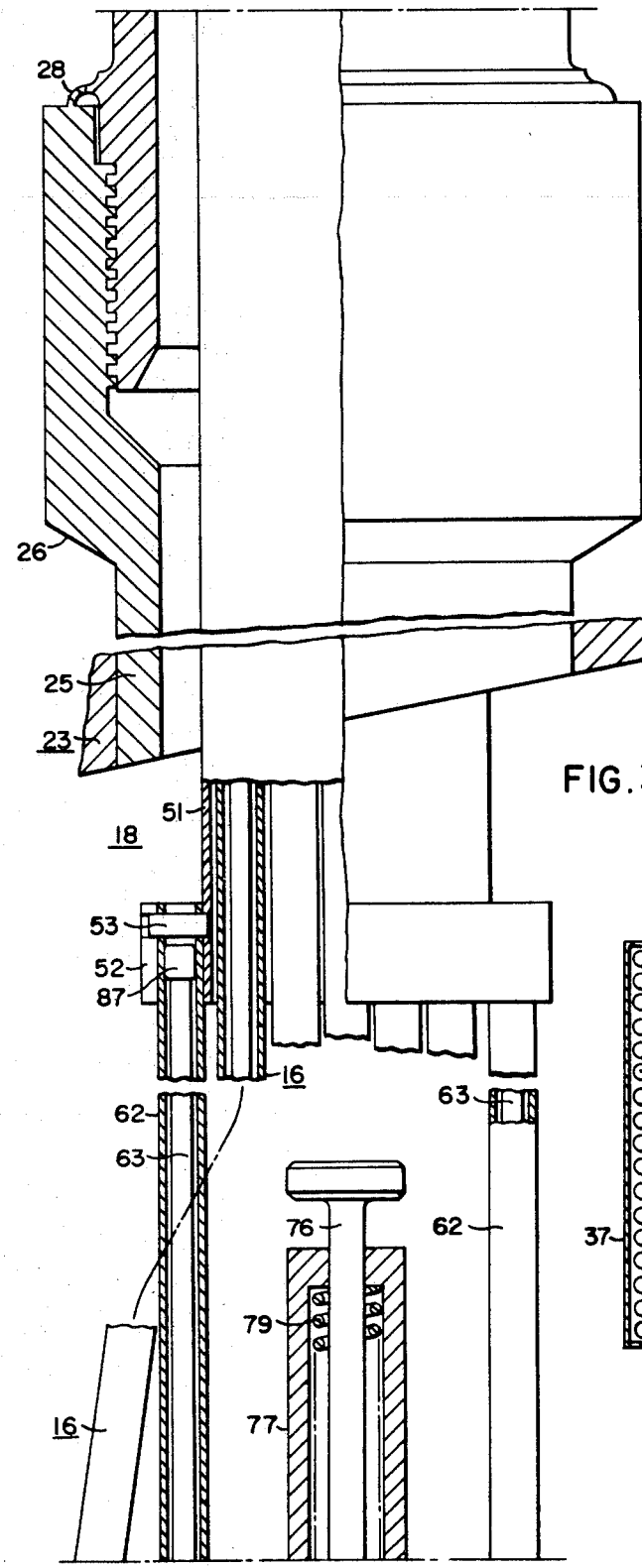
Figure 11:
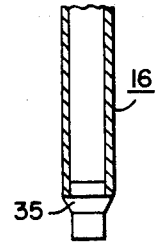
FIG. 11 is a detail view showing the manner of sealing the lower end of one of the thimbles for the control elements.

As shown more clearly in FIG. 3, each port 25 is sealed by means of a head adapter 26 which is sealed in the head 23, as by welding, and a seal sleeve 27 which is threaded into the upper end of the adapter 26 and sealed thereto, as by welding at 28. As shown in FIG. 2, a gasket 29 is disposed between an internal flange 31 at the upper end of the sleeve 27 and a shoulder 32 on a generally cylindrical head 33 which is part of the support structure 18. All of the thimbles 16 for the control elements 17 for each fuel assembly 19 pass through one port 25 and terminate above the upper end of the head 33. Spaced partitions 34 are provided between the thimbles 16 in the head 33 as shown in FIG. 2. The thimbles 16 may be sealed in the head 33, as by brazing. The lower end of each thimble 16 is sealed by a plug 35 as shown in FIG. 11.

Since the upper end of each thimble is open and is outside the vessel 10, the control elements 17 operate in air or a gas, such as helium, which may be introduced into the thimbles to assist in cooling the control elements. In this manner, the control elements are separated from the liquid coolant and they are not subjected to the relatively high internal pressure in the reactor vessel. Likewise, the control rod drive mechanism (not shown), which actuates the control elements, is separated from the liquid coolant and it is not subjected to the internal pressure and the temperature in the reactor vessel. Thus, the mechanism does not require a hermetically sealed housing or shaft seals. Furthermore, the mechanism may be lubricated by conventional means. The mechanism may be of a rack and pinion type or a magnetic jack type, or other suitable type of mechanism.

Figure 7:
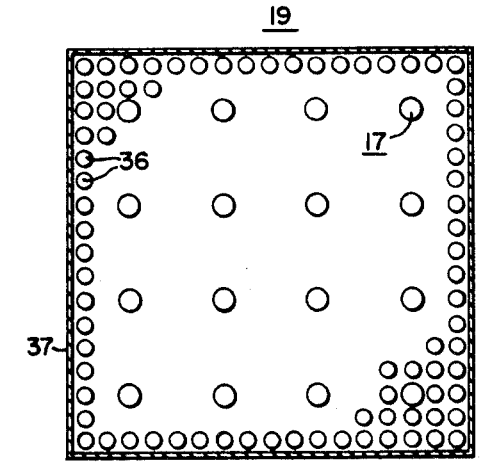
FIG. 7 is a view, in cross section, showing the arrangement of fuel rods and control elements in a fuel assembly.
Figure 4:
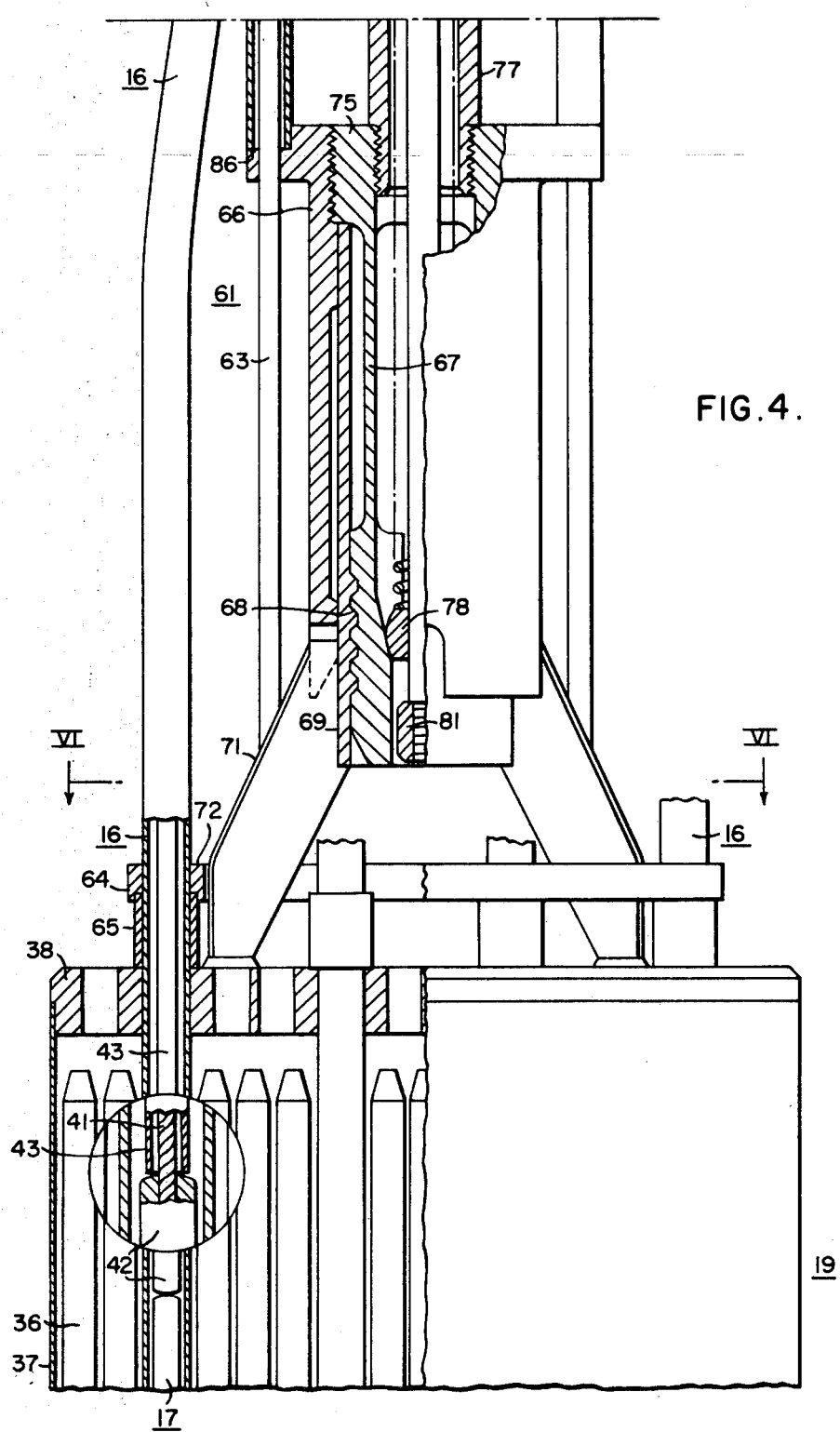

As shown in FIGS. 4 and 7, each fuel assembly 19 comprises a plurality of fixedly supported fuel rods vertically disposed within a grid-like retaining structure or a generally rectangular can 37 (as shown), or other suitable retainer, having a cover plate 38 and a lower end structure 39 which extends into an opening in the core plate 12, as shown in FIG. 1. The fuel rods 36 may be of a type well known in the art.

In order to prevent flux peaking, which results in hot spots in the reactor core, the thimbles 16 containing the control elements are interspersed among the fuel rods in each fuel assembly 19 in a generally uniform grid cross section pattern as shown more clearly in FIG. 7. Instead of the usual omission for control rod slots in the core structure, a number of fuel rods are omitted from each fuel assembly to provide spaces for the thimbles 16 which house the control elements. In the present structure, sixteen control elements are provided for each fuel assembly 19 with the control elements being arranged in four rows of four elements in each row. The uniformity of distribution of poison material and the simplicity of the fuel assembly construction result in practically no flux peaking in the core. The withdrawal of the poison does not result in more moderation in that part of the core. The structure is readily adaptable to the use of different amounts of poison in different core locations for flux shaping. Furthermore, less expensive poison material, such as boronated steel, can be used since the control elements are supported on steel cables 41 which provide all the necessary strength required to support the control elements.

As shown more clearly in FIG. 4, each control element 17 comprises a plurality of relatively short cylindrical sections 42 which are threaded on the wire rope cable 41 which carries the control element. The control element sections 42 can be easily manufactured from a variety of materials. They may be made by pellet pressing and sintering methods or by machining from bar stock at high production rates. The use of brittle materials for control elements is feasible because the ductile cable 41 carries all tensile loads. As previously stated, boronated steel may be utilized for the poison material.

Figure 10:
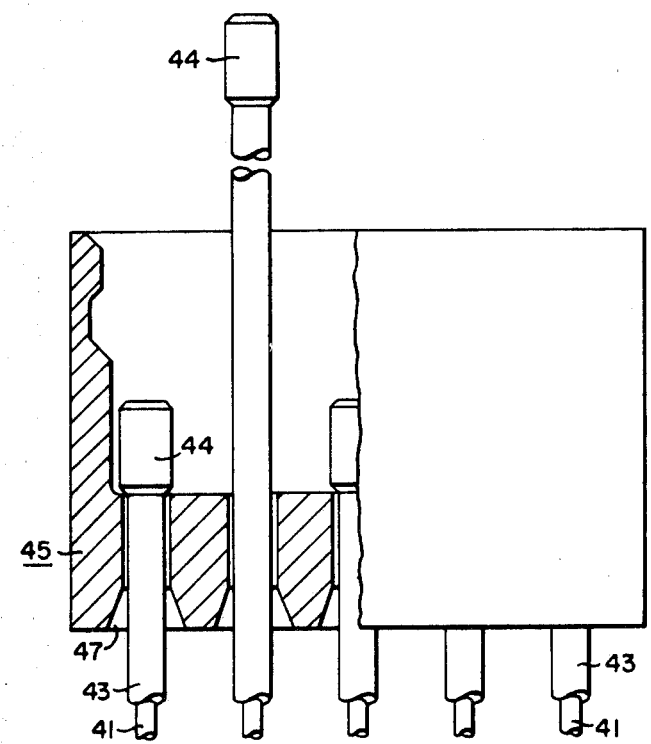
FIG. 10 is a view, partly in section and partly in elevation, showing the manner of actuating the control elements.

As also shown in FIG. 4, a flexible tube 43 surrounds each cable 41 throughout the length of the cable from the topmost control element section 42 to the upper end of the cable to which a cap 44 is secured. As shown in FIGS. 2 and 10, all of the control elements for each fuel assembly 19 are simultaneously raised by means of a lifting bail 45 which is attached to the control rod drive mechanism by means of a coupling member 46. Each cable 41 and its surrounding tube 43 pass through an opening 47 in the bail 45 which is large enough to permit the tube to slide freely in the opening but small enough to prevent the cap 44 from passing through the opening. In this manner, a control element which is stuck in the raised position may remain in the raised position when the bail 45 is lowered to lower the other control elements operated by the bail. The bail 45 slides freely over the cable extension tube 43 of the stuck element, thereby permitting the control elements that are free to scram even though one or more of the complete group is stuck. The tube 43 has sufficient strength to prevent kinking of the cable which might otherwise occur if the cable extension tube 43 was not provided.

The cables 41 are the thinnest possible consistent with strength requirements in order that they may be capable of absorbing energy of a scram operation. In this manner shock absorbers are not required or, at least, the duty imposed on shock absorbers is reduced.

It will be noted that the thimbles 16 provide a high degree of safety since collapsing of a thimble under external pressure will not cause loss of coolant. If collapsing should occur in a thimble with the poison fully inserted, it would be failed safe. If the poison were withdrawn, the small increment involved for one control element would not have any appreciable effect on core reactivity.

Figure 9:
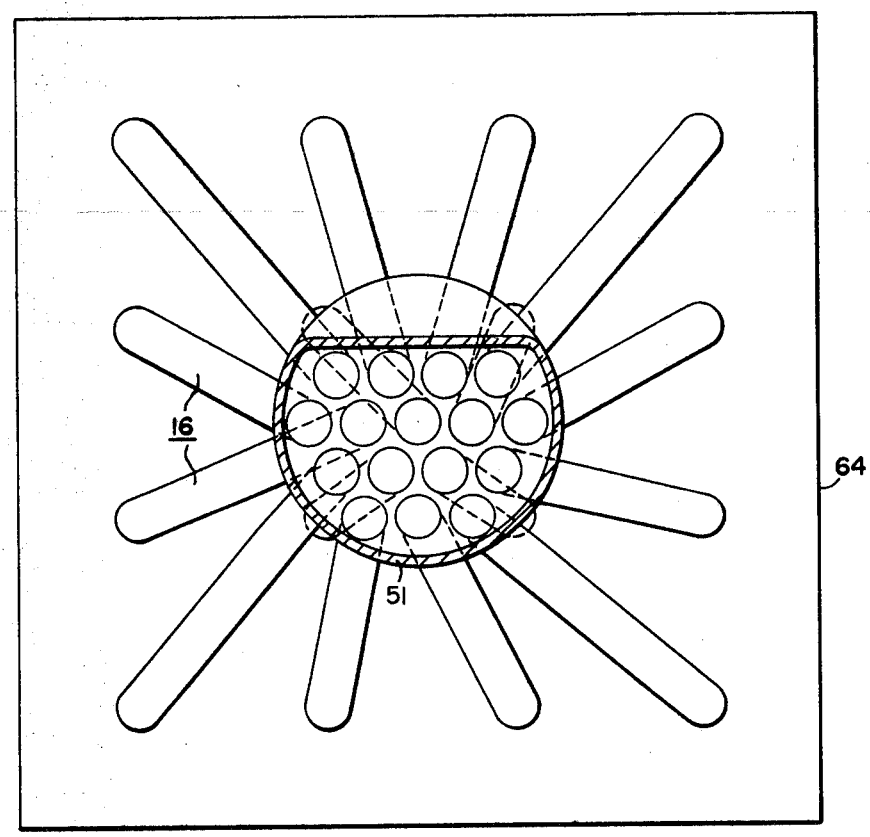
FIG. 9 is a view, partly in plan and partly in section, showing the control element thimble distributions.

The distribution of the control element thimbles for one fuel assembly is shown in FIG. 9. As previously stated, all the thimbles from one fuel assembly must pass through a single port in the vessel head. However, the arrangement results in only a small amount of curvature of large radius in the thimble furthest from the fuel assembly center line. Thus, the curvature will not materially restrict motion of the control elements inside the thimbles. The thimble seal at the vessel head penetration carries the weight of the fuel assembly through a tubular member connecting it to the fuel assembly as will be described more fully hereinafter.

Referring again to FIG. 9, it will be noted that 19 thimbles are provided while only 16 are used for housing the control element. Thus, the remaining three thimbles are available for core instrumentation and might be used as follows:

(1) Outlet coolant temperature measurement.
(2) Flux wire or neutron detector.
(3) Torque tube for inlet orifice control.

The basic control element thimble arrangement is inherently adapted to core instrumentation and, except for the extra thimbles, this involves no additional parts or structures to accommodate such instrumentation. A further advantage of the arrangement results from the fact that there are no curves in the thimbles inside of the reactor which would increase the load on the flux wire drives.

Since it is desirable to reuse as much of the thimble and seal assembly structure as possible at each core loading, the thimbles have been constructed to be removable from the fuel assembly. As previously explained, the head adapter 26 and sleeve 27 carry the weight of the fuel assembly by means of the support structure 18. As shown in FIGS. 2, 3 and 4, the support structure 18 includes a generally cylindrical support tube 51, the lower end of which is attached to a ring 52 by means of pins 53 inside the reactor vessel. The upper end of the tube 51 is threaded into the supporting head 33 and retained by a pin 54. A support ring 55 is threaded onto the upper end of the head 33 with a spacing sleeve 56 disposed to maintain a predetermined distance between the ring 55 and the shoulder 32 on the head 33. When bolts 57, which extend through the ring 55, are tightened against the top of the seal sleeve 27, the shoulder 32 is tightened against the gasket 29 and the flange 31 on the sleeve 27 as previously explained.

Figure 6:
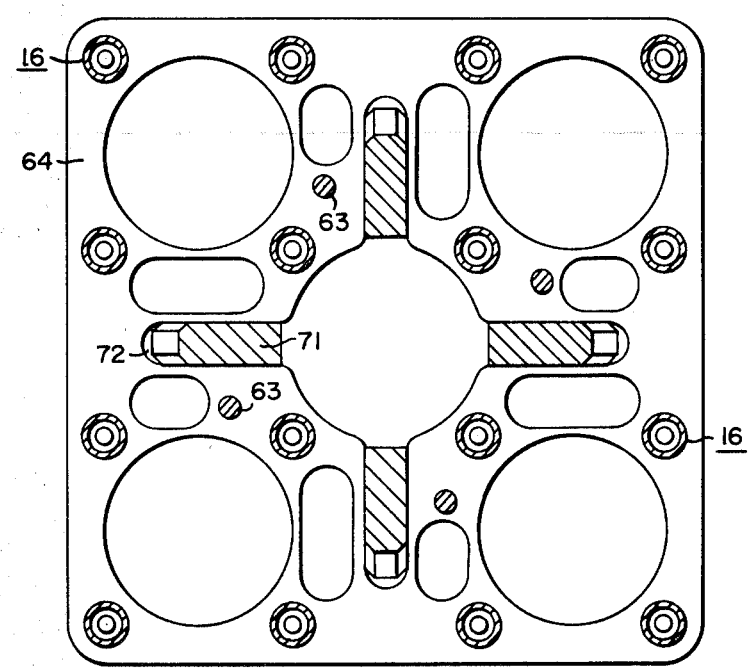
FIG. 6 is a view, in section, taken along the line VI—VI in FIG. 4.
Figure 8:
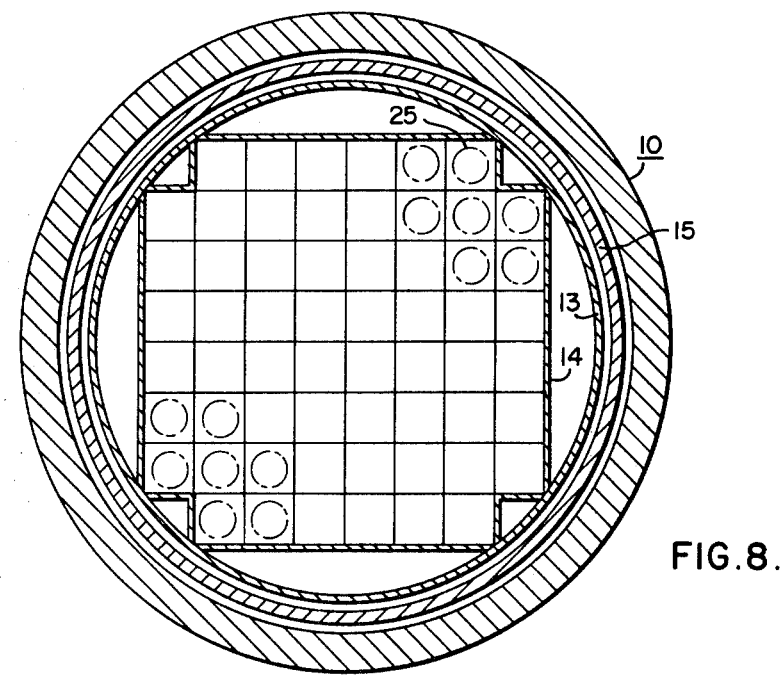
FIG. 8 is a view, in cross section, showing the arrangement of fuel assemblies in the reactor.

The ring 52 is connected to a latch or coupling device 61 by means of four supporting sleeves 62 each one of which surrounds a telescoping rod 63 the lower end of which is threaded into a thimble guide plate 64 which is spaced from the cover plate 38 of the fuel assembly 19 by spacing sleeves 65. The upper end of each sleeve 62 is attached to the ring 52 by means of the pin 53. The lower end of the tube 62 is secured to a flanged sleeve 66 of the device 61. Flexure arms 67 have teeth 68 thereon which engage corresponding teeth on a sleeve 69. As shown in FIGS. 4 and 6, the sleeve 69 has four outwardly and downwardly extending arms 71 which are secured to the sleeve 69 by welding and extend through openings 72 in the guide plate 64 with the lower ends of the arms 71 being secured to the fuel assembly cover plate 38, as by welding. The upper ends of the flexure arms 67 have a circular head 75 which is threaded into the upper end of the sleeve 66. Thus, when the teeth 68 are engaged as shown in FIG. 4, the weight of the fuel assembly is carried by the arms 71, the sleeves 69 and 67 through the teeth 68, the head 75 of the flexure arms 67, the flanged head of the sleeve 66, the support sleeves 62, the ring 52, the support tube 51, the support head 33, the ring 55, the bolts 57, the sleeve 27, and the head adapter 26 which is welded into the vessel head 23.

In order to remove the thimble assembly it is necessary to loosen the bolts 57, remove the support ring 55 and then remove the head 23 from the reactor vessel 10 by removing the head bolts 24. The latch or coupling device 61 is then released by raising a latch rod 76 which extends through a spring housing 77 and a spreader 78 which is slidably disposed upon the rod 76. A compression spring 79 surrounding the rod 76 normally biases the spreader 78 downwardly to maintain the teeth 68 on the flexure arms 67 and the sleeve 69 in engagement. When the rod 76 is raised, a nipple 81 threaded onto the lower end of the rod, engages the spreader 78 and raises it to release the coupling device 61.

Figure 5:
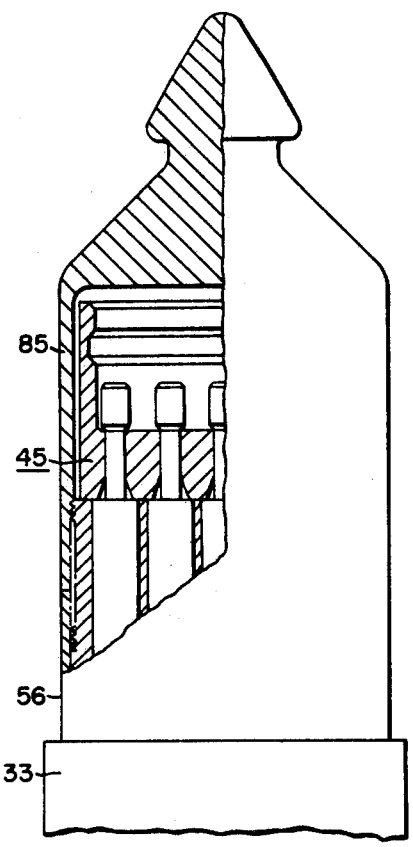
FIG. 5 is a view, partly in section and partly in elevation, of a cap which is placed on the control element assembly during refueling of the reactor.

The thimble assembly may be removed from the reactor vessel by attaching a crane, or other suitable tool, to a lifting cap 85 which is threaded onto the support head 33 in place of the support ring 55 which has previously been removed from the head 33. The manner of attaching the cap 85 to the head 33 is shown in FIG. 5. Raising the cap 85 lifts the bail 45, the head 33 and the support tube 51 along with the ring 52 and the support sleeves 62 a sufficient distance to lift the thimbles 16 and the control elements 17 out of the fuel assembly 19 without raising the thimble guide plate 64. When a shoulder 86 on the sleeve 66 through which each guide rod 63 extends engages a cap 87 on the upper end of the guide rod further upward movement of the support head 33 raises the guide plate 64 along with the thimbles 16. In this manner the guide plate 64 maintains the lower ends of the thimbles in alignment for re-entry into a new fuel assembly. The fuel assembly 19 may be removed from the reactor vessel after the removal of the thimble assembly.

When the thimble assembly is reinstalled after the installation of a new fuel assembly, the thimbles 16 are guided into the proper places in the fuel assembly by the guide plate 64 which is spaced from the top plate 38 of the fuel assembly by the spacing sleeves 65. As the thimbles are lowered into the fuel assembly, the support sleeves 62 telescope over the guide rods 63. Thus, a lost-motion connection is provided between the guide plate 64 and the support tube 51.

The coupling means 61 is reconnected as the flexure arms 67 descend into the sleeve 69 and the sleeve 66 telescopes over the outside of the sleeve 69. The latch rod 76 is retained in its raised position by a suitable tool to permit the teeth 68 to become engaged. The rod 76 is then released and the spreader 78 is forced downwardly by the spring 79 to maintain the teeth 68 in engagement. The distance between the nipple 81 and the spreader 78 permits thermal expansion between the members without raising the spreader 78.

After the installation of the fuel and the thimble assemblies, the lifting cap 85 is removed, and the vessel head 23 and the seal assembly including the support ring 55 are reinstalled. As previously explained, when the bolts 57 are tightened against the upper end of the seal ring 27 the weight of the fuel assembly is carried by the support tube 51. Thus, the lower core plate 12 serves mainly as a positioning guide for the fuel assemblies during operation, but supports the core during the refueling until all fuel assemblies are lifted free upon tightening the port seals by means of the bolts 57.

The present reactor construction has the following safety advantages over prior constructions:

(1) Control element cables will supply damping energy required to prevent damage in event of mechanism shock absorber failure.
(2) Control elements stay with each fuel assembly and in event of jamming in a port during vessel head removal, no reactivity hazard would be incurred.
(3) Failure or rupture of a thimble would eject only one control element, not enough to seriously affect reactivity of core.
(4) Collapsing of a thimble would not even result in a leak in the primary coolant system and would probably trap some poison of that element in the core.
(5) Thermal gradients cannot cause bowing or distortion of control elements resulting in seizure.

The construction described provides improved thermal and hydraulic performance by the nature of the more nearly homogeneous construction of the fuel and control elements. Reactors with cruciform control rods require a substantially non-heat transfer flow, due in large part to the clearances required around control rods. A reduction in the required by-pass flow, for a given total flow, will allow the reactor to operate at a corresponding increase in the power output. Improvements in the engineering hot channel factors are inherent in the present structure due to the absence of non-uniformity of flow paths associated with control rods. No corrosion problem is anticipated in the present structure since the control elements are separated from the coolant by thimbles which may be made from stainless steel.

As previously explained, the elimination of control rod followers reduces the height and the cost of the reactor vessel. The cost of the control rod drive mechanism is reduced since costly high pressure housings are not required and the mechanism is not required to operate at a high temperature. The cost of the control elements and reactor internals is reduced.

Since numerous changes may be made in the above-described structure and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. In a nuclear reactor, in combination, a reactor vessel having a liquid coolant therein, a plurality of fuel assemblies immersed in the coolant, each fuel assembly including a plurality of fixedly supported fuel rods with a plurality of control elements interspersed among the fuel rods in a predetermined pattern, a generally cylindrical thimble for housing each control element, each of said thimbles being sealed at that end located within the reactor vessel, the interior of said thimbles being isolated from the interior of said reactor vessel, and the other ends of the thimbles extending at least to the exterior surface of the reactor vessel.

2. The combination defined in claim 1, including actuating means for simultaneously moving the control elements for each fuel assembly.

3. The combination defined in claim 2, wherein the actuating means is operable to insert part of the control elements with at least one other element remaining in the withdrawn position.

4. The combination defined in claim 2, wherein the actuating means is disposed externally of the reactor vessel.

5. The combination defined in claim 1, including a flexible cable movably disposed inside each thimble for carrying the control element in the thimble.

6. The combination defined in claim 5, including a flexible tube surrounding each cable inside each thimble.

7. The combination defined in claim 6, including a bail for simultaneously moving the cables and the tubes within the thimbles housing the control elements for each fuel assembly, and said tubes being slidably mounted in said bail.

8. The combination defined in claim 5, wherein each control element comprises a plurality of relatively short cylindrical sections threaded on the cable.

9. The combination defined in claim 1, including a removable head on the reactor vessel, said head having a port therein for each fuel assembly, and all of the thimbles for each fuel assembly passing through the port for said assembly.

10. The combination defined in claim 9, including a support tube extending through each port around the thimbles for supporting the fuel assembly.

11. The combination defined in claim 10, including coupling means disposed inside the reactor vessel for releasing the fuel assembly from said support tube to permit the thimbles to be withdrawn from the fuel assembly.

12. The combination defined in claim 11, including a guide plate for said thimbles disposed above the fuel assembly, and lost-motion means connecting the guide plate to the support tube.

References Cited

UNITED STATES PATENTS 3,361,635   1/1968   Long _____ 176—36

FOREIGN PATENTS 1,100,831   3/1961   Germany _____ 176—36

BENJAMIN R. PADGETT, Primary Examiner

H. E. BEHREND, Assistant Examiner